(12) United States Patent
Inoue

(10) Patent No.: US 9,933,789 B2
(45) Date of Patent: Apr. 3, 2018

(54) POSITIONER

(71) Applicant: Azbil Corporation, Tokyo (JP)

(72) Inventor: Kazuhisa Inoue, Tokyo (JP)

(73) Assignee: Azbil Corporation, Tokyo (JP)

( * ) Notice: Subject to any disclaimer, the term of this patent is extended or adjusted under 35 U.S.C. 154(b) by 209 days.

(21) Appl. No.: 15/072,604

(22) Filed: Mar. 17, 2016

(65) Prior Publication Data

US 2016/0274594 A1    Sep. 22, 2016

(30) Foreign Application Priority Data

Mar. 17, 2015  (JP) .................................. 2015-053904

(51) Int. Cl.
| | |
|---|---|
| G05D 7/00 | (2006.01) |
| G05D 7/06 | (2006.01) |
| F15B 5/00 | (2006.01) |
| F15B 19/00 | (2006.01) |
| F15B 21/08 | (2006.01) |
| F16K 37/00 | (2006.01) |
| G05B 13/02 | (2006.01) |

(52) U.S. Cl.
CPC .......... *G05D 7/0635* (2013.01); *F15B 5/006* (2013.01); *F15B 19/002* (2013.01); *F15B 21/087* (2013.01); *F16K 37/0041* (2013.01); *F16K 37/0083* (2013.01); *F16K 37/0091* (2013.01); *G05B 13/024* (2013.01); *F15B 2211/6336* (2013.01)

(58) Field of Classification Search
CPC ..... F02D 9/1095; G05D 7/0635; F15B 5/006; F15B 19/002
See application file for complete search history.

(56) References Cited

U.S. PATENT DOCUMENTS

| | | | | |
|---|---|---|---|---|
| 5,931,180 | A * | 8/1999 | Nagasaka | ............... G05B 19/19 137/487.5 |
| 6,286,532 | B1 * | 9/2001 | van Nieuwstadt | .. F16K 31/0675 137/1 |
| 8,439,329 | B2 * | 5/2013 | Kresse | ................... F15B 19/002 137/625.64 |

(Continued)

FOREIGN PATENT DOCUMENTS

| | | |
|---|---|---|
| JP | S62-28118 A | 2/1987 |
| JP | 3511458 B2 | 3/2004 |

*Primary Examiner* — Vincent Tran

(74) *Attorney, Agent, or Firm* — Oblon, McClelland, Maier & Neustadt, L.L.P.

(57) ABSTRACT

The measured operation time of a setting/operating device is corrected using a first corrected value table and a second corrected value table and the size of the setting/operating device is defined based on the corrected operation time. The first corrected value table defines, as a first corrected value, the corrected value corresponding to the operation time region defined so as to correspond to the size of the setting/operating device and the sliding resistance region defined by dividing the range taken by the sliding resistance (friction) of the valve stem of a regulating valve and the second corrected value table defines, as a second corrected value, the corrected value corresponding to the operation time region defined so as to correspond to the size of the setting/operating device and the supply air pressure region defined by dividing the range taken by a supply air pressure.

1 Claim, 11 Drawing Sheets

(56) References Cited

U.S. PATENT DOCUMENTS

| | | | |
|---|---|---|---|
| 8,641,009 B2* | 2/2014 | Inagaki | F15B 5/003 137/487.5 |
| 8,814,133 B2* | 8/2014 | Li | F15B 19/002 251/129.04 |
| 2001/0037159 A1* | 11/2001 | Boger | F15B 5/006 700/52 |
| 2001/0037670 A1* | 11/2001 | Boger | F15B 5/006 73/1.72 |
| 2009/0230338 A1* | 9/2009 | Sanders | G05B 19/39 251/129.01 |
| 2012/0248356 A1* | 10/2012 | Okuda | F16K 31/12 251/129.15 |
| 2014/0102549 A1* | 4/2014 | Okuda | F15B 5/006 137/82 |

* cited by examiner

| CONTROL PARAMETER | HYSTERESIS LEVEL | SETTING/OPERATING DEVICE SIZE | | | | | | |
|---|---|---|---|---|---|---|---|---|
| | | KP | TI | TD | GE | GKP | GTI | GTD |
| X | H | a1 | b1 | c1 | ±d% | e1 | f1 | g1 |
| | M | a2 | b2 | c2 | ±d% | e2 | f2 | g2 |
| | L | a3 | b3 | c3 | ±d% | e3 | f3 | g3 |
| Y | H | a4 | b4 | c4 | ±d% | e4 | f4 | g4 |
| | M | a5 | b5 | c5 | ±d% | e5 | f5 | g5 |
| | L | a6 | b6 | c6 | ±d% | e6 | f6 | g6 |
| Z | H | a7 | b7 | c7 | ±d% | e7 | f7 | g7 |
| | M | a8 | b8 | c8 | ±d% | e8 | f8 | g8 |
| | L | a9 | b9 | c9 | ±d% | e9 | f9 | g9 |

| FRICTION | SETTING/OPERATION DEVICE SIZE | | |
|---|---|---|---|
| | X (a~b) | Y (b~c) | Z (c~) |
| 0~10 | 0.01 | 0.02 | 0.03 |
| 10~20 | 0.0125 | 0.025625 | 0.04 |
| 20~30 | 0.02 | 0.0425 | 0.07 |
| 30~40 | 0.0325 | 0.070625 | 0.12 |
| 40~50 | 0.05 | 0.11 | 0.19 |
| 50~60 | 0.0725 | 0.160625 | 0.28 |
| 60~70 | | 0.2225 | 0.39 |
| 70~80 | | | 0.52 |

| SUPPLY AIR PRESSURE | X (a~b) | Y (b~c) | Z (c~) |
|---|---|---|---|
| 0~100 | 0 | | |
| 100~200 | 0.05 | 0 | 0 |
| 200~300 | 0.01 | 0.5 | 0.7 |
| 300~400 | 0.015 | 1 | 1.4 |
| 400~500 | | 1.5 | 2.1 |
| 500~600 | | | 2.8 |
| 600~700 | | | 3.5 |
| 700~800 | | | |

TD

POSITIONER

CROSS-REFERENCE TO RELATED APPLICATION

This application claims priority to Japanese Patent Application No. 2015-053904 filed Mar. 17, 2015. This application is incorporated herein by reference in its entirety.

FIELD OF THE INVENTION

The present invention relates to a positioner controlling the opening of a regulating valve.

BACKGROUND

A conventional positioner is attached to a regulating valve provided in a pipe through which fluid flows so as to control the opening of the regulating valve.

This positioner includes a controlling portion obtaining the difference between a valve opening setting value sent from a higher-level device and an actual opening value fed back from the regulating valve and outputting, as a control output, an electric signal obtained by applying a predetermined calculation to the difference, an electric-pneumatic converter converting the control output from the controlling portion to an air pressure signal, and a pilot relay amplifying the air pressure signal converted by the electric-pneumatic converter and outputting the amplified signal to the setting/operating device of the regulating valve (see Japanese Unexamined Patent Application Publication No. S62-28118, for example).

FIG. 9 illustrates the structure of the main part of a conventional positioner. In this drawing, reference numeral 1 indicates a positioner, reference numeral 2 indicates a regulating valve, and the regulating valve 2 is provided with an opening sensor 3 detecting the opening (valve opening) of the regulating valve. The positioner 1 includes a controlling portion 11, an electric-pneumatic converter (EPM) 12, and a pilot relay 13. The valve opening of the regulating valve 2 detected by the opening sensor 3 is fed back to the controlling portion 11 as an actual opening value θpv.

In the positioner 1, the controlling portion 11 obtains the difference between a valve opening setting value θsp from a higher-level device (not illustrated) and the actual opening value θpv from the opening sensor 3 and outputs an electric signal obtained by applying PID control calculation to this difference as a control output MV.

The electric-pneumatic converter 12 converts the control output MV from the controlling portion 11 to an air pressure signal (nozzle back pressure) Pn. The pilot relay 13 amplifies the air pressure signal Pn from the electric-pneumatic converter 12 and outputs the amplified signal to a setting/operating device 2a of the regulating valve 2 as an air pressure Po. This causes air with the air pressure Po to flow into the diaphragm chamber of the setting/operating device 2a to adjust the opening of a valve 2b of the regulating valve 2.

In the positioner 1, the electric-pneumatic converter 12 and the pilot relay 13 constitute an electric-pneumatic converting portion 14 converting the control output MV from the controlling portion 11 to the air pressure (output air pressure) Po for the regulating valve 2. In addition, a supply air pressure (instrumentation air) Ps from the outside is supplied to the electric-pneumatic converter 12 and the pilot relay 13.

FIG. 10 illustrates the main part of the regulating valve 2. The regulating valve 2 is provided with a valve stem 2d moving up and down by the air pressure Po from the positioner 1 supplied to a diaphragm chamber 2c in the setting/operating device 2a and a packing gland 2f is provided between the outer peripheral surface of the valve stem 2d and the inner peripheral surface of a stem insertion hole 2e as illustrated in FIG. 10. The packing gland 2f includes a plurality of ring-shaped packings provided in close contact with each other in the shaft direction of the valve stem 2d so as to prevent fluid from leaking from the gap.

In the positioner 1, it is necessary to set appropriate control parameters matching the characteristics of the regulating valve 2 for the controlling portion 11 to properly control the opening of the regulating valve 2. For this purpose, before actually controlling the opening of the regulating valve 2 after newly installing (or replacing) the regulating valve 2 in the field or during execution of periodic maintenance, the control parameters used for the controlling portion 11 are tuned. The tuning of the control parameters is performed automatically during automatic setup or the like (see Japanese Patent No. 3511458, for example).

In this case, when receiving an automatic tuning instruction, the controlling portion 11 actually drives the regulating valve 2 and obtains, as the operation time, the response time when the valve opening of the regulating valve 2 continuously shifts from, for example, the 10% position to the 90% position and, based on the obtained operation time, determines the size of the setting/operating device 2a with reference to the setting/operating device size/operation time table defining the correspondence between the size of the setting/operating device and the operation time (step S101 illustrated in FIG. 11). The operation time in this case is generally referred to as the operation speed, but the operation time is used in this specification.

Then, the controlling portion 11 obtains, as the friction, the sliding resistance (stem reciprocating motion resistance) of the valve stem 2d of the regulating valve 2 based on a step response from, for example, the 40% position to the 60% position of the valve opening position of the regulating valve 2 (step S102) and determines the hysteresis level (H/M/L) based on the obtained friction with reference to a hysteresis level (HYS)/friction table (step S103).

Then, the controlling portion 11 selects the corresponding control parameters with reference to a control parameter table defining the correspondence among the size of the setting/operating device, the hysteresis level, and the control parameters based on the size of the setting/operating device determined in step S101 and the hysteresis level determined in step S103 (step S104) and sets the selected control parameters as the appropriate control parameters used to control the opening of the regulating valve 2 (step S105).

However, in the regulating valve in which the valve opening is controlled by such a positioner, the operation time of the setting/operating device changes depending on the supply air pressure (Ps) and the sliding resistance (friction) of the valve stem of the regulating valve. The operation time of the setting/operating device tends to become short as the supply air pressure increases and tends to become long as the friction increases (that is, the hysteresis increases). When the supply air pressure is high (>400 kPa) or the hysteresis is large (>10%), the effect on the operation time becomes large.

When the operation time of the setting/operating device changes due to the supply air pressure or friction, the operation time deviates from the range of the normal operation time in determination of the size of the setting/operating device in step S101 illustrated in FIG. 11, the size of the setting/operating device is incorrectly determined, and the control parameters selected in step S104 are not optimum control parameters, possibly causing problems (such as large stabilization time, large overshooting, and hunting) in the dynamic characteristics of the positioner.

Although the control parameters may be adjusted manually to address this problem, the user or the service department cannot easily address it since setting items are many and this work needs adjustment skills.

The invention addresses the above problem with an object of providing a positioner that can select and set appropriate control parameters even when the operation time of the setting/operating device changes due to the supply air pressure or friction.

SUMMARY

To achieve this object, according to examples of the invention, there is provided a positioner including a controlling portion outputting, as a control output, an electric signal according to a difference between a valve opening setting value sent from a higher-level device and an actual opening value fed back from a regulating valve and an electric-pneumatic converting portion converting the control output from the controlling portion to an air pressure and outputting the air pressure to a setting/operating device of the regulating valve, the positioner including a control parameter storing portion storing, for each size of the setting/operating device used in the regulating valve, a correspondence between a level of a sliding resistance of the valve stem of the regulating valve and a control parameter used to control a valve opening of the regulating valve, a setting/operating device size/operation time storing portion storing a correspondence between a size of the setting/operating device and an operation time for each size of the setting/operating device used in the regulating valve, a first corrected value storing portion storing, as a first corrected value, a corrected value defined so as to correspond to an operation time region defined so as to correspond to the size of the setting/operating device used in the regulating valve and a sliding resistance region defined by dividing a range taken by the sliding resistance of the valve stem of the regulating valve, a second corrected value storing portion storing, as a second corrected value, a corrected value defined so as to correspond to the operation time region defined so as to correspond to the size of the setting/ operating device used in the regulating valve and a supply air pressure region defined by dividing an area taken by a pressure of instrumentation air to be supplied to the electric-pneumatic converting portion, an operation time measurement portion measuring an operation time of the setting/ operating device used in the regulating valve by actually driving the regulating valve, a sliding resistance measurement portion measuring a sliding resistance of the valve stem of the regulating valve by actually driving the regulating valve, a supply air pressure measurement portion measuring the pressure of the instrumentation air supplied to the electric-pneumatic converting portion as a supply air pressure, a first corrected value acquisition portion acquiring a first corrected value corresponding to the operation time measured by the operation time measurement portion and the sliding resistance measured by the sliding resistance measurement portion from the first corrected value storing portion, a second corrected value acquisition portion acquiring a second corrected value corresponding to the operation time measured by the operation time measurement portion and the supply air pressure measured by the supply air pressure measurement portion from the second corrected value storing portion, an operation time correction portion correcting the operation time measured by the operation time measurement portion using the first corrected value acquired by the first corrected value acquisition portion and the second corrected value acquired by the second corrected value acquisition portion, a setting/operating device size acquisition portion acquiring the size of the setting/operating device corresponding to the operation time corrected by the operation time correction portion from the setting/operating device size/operation time storing portion, and a control parameter selecting portion selecting the control parameter corresponding to the size of the setting/operating device acquired by the setting/operating device size acquisition portion and the sliding resistance measured by the sliding resistance measurement portion from the control parameter storing portion, in which the controlling portion controls the valve opening of the regulating valve using the control parameter selected by the control parameter selecting portion.

In the invention, the first corrected value corresponding to the operation time measured by the operation time measurement portion and the sliding resistance measured by the sliding resistance measurement portion is acquired from the first corrected value storing portion and the second corrected value corresponding to the operation time measured by the operation time measurement portion and the supply air pressure measured by the supply air pressure measurement portion is acquired from the second corrected value storing portion, the operation time measured by the operation time measurement portion is corrected by the first corrected value acquired by the first corrected value acquisition portion and the second corrected value acquired by the second corrected value acquisition portion, and the size of the setting/operating device corresponding to the corrected operation time is acquired from the setting/operating device size/operation time storing portion.

In this case, since the operation time is corrected by the first corrected value and the second corrected value, the correct size of the setting/operating device is acquired by defining, as appropriate values, the first corrected value and the second corrected value to be stored in the first corrected value storing portion and the second corrected value storing portion. Then, the control parameter corresponding to the acquired size of the setting/operating device and the sliding resistance measured by the sliding resistance measurement portion is selected from the control parameter storing portion and the valve opening of the regulating valve is controlled using the selected control parameter. Since the correct size of the setting/operating device is acquired by the setting/operating device size acquisition portion, the control parameter is set as an appropriate control pattern.

According to examples of the invention, the first corrected value corresponding to the operation time measured by the operation time measurement portion and the sliding resistance measured by the sliding resistance measurement portion is acquired from the first corrected value storing portion and the second corrected value corresponding to the operation time measured by the operation time measurement portion and the supply air pressure measured by the supply air pressure measurement portion is acquired from the second corrected value storing portion, and the operation time measured by the operation time measurement portion is corrected by the first corrected value acquired by the first corrected value acquisition portion and the second corrected value acquired by the second corrected value acquisition portion. Accordingly, the optimum control parameters can be selected and set even when the operation time of the setting/operating device changes due to the supply air pressure or the friction by defining, as appropriate values, the first corrected value and the second corrected value to be stored in the first corrected value storing portion and the second corrected value storing portion so as to acquire the correct size of the setting/operating device.

BRIEF DESCRIPTION OF THE DRAWINGS

FIG. 3 illustrates a control parameter table to be stored in a control parameter storing portion of the positioner.

FIG. 5 illustrates a first corrected value table to be stored in a first corrected value storing portion of the positioner.

FIG. 7 illustrates a second corrected value table to be stored in a second corrected value storing portion of the positioner.

DETAILED DESCRIPTION

An example of the invention will be described in detail below with reference to the drawings.

Figure 1:
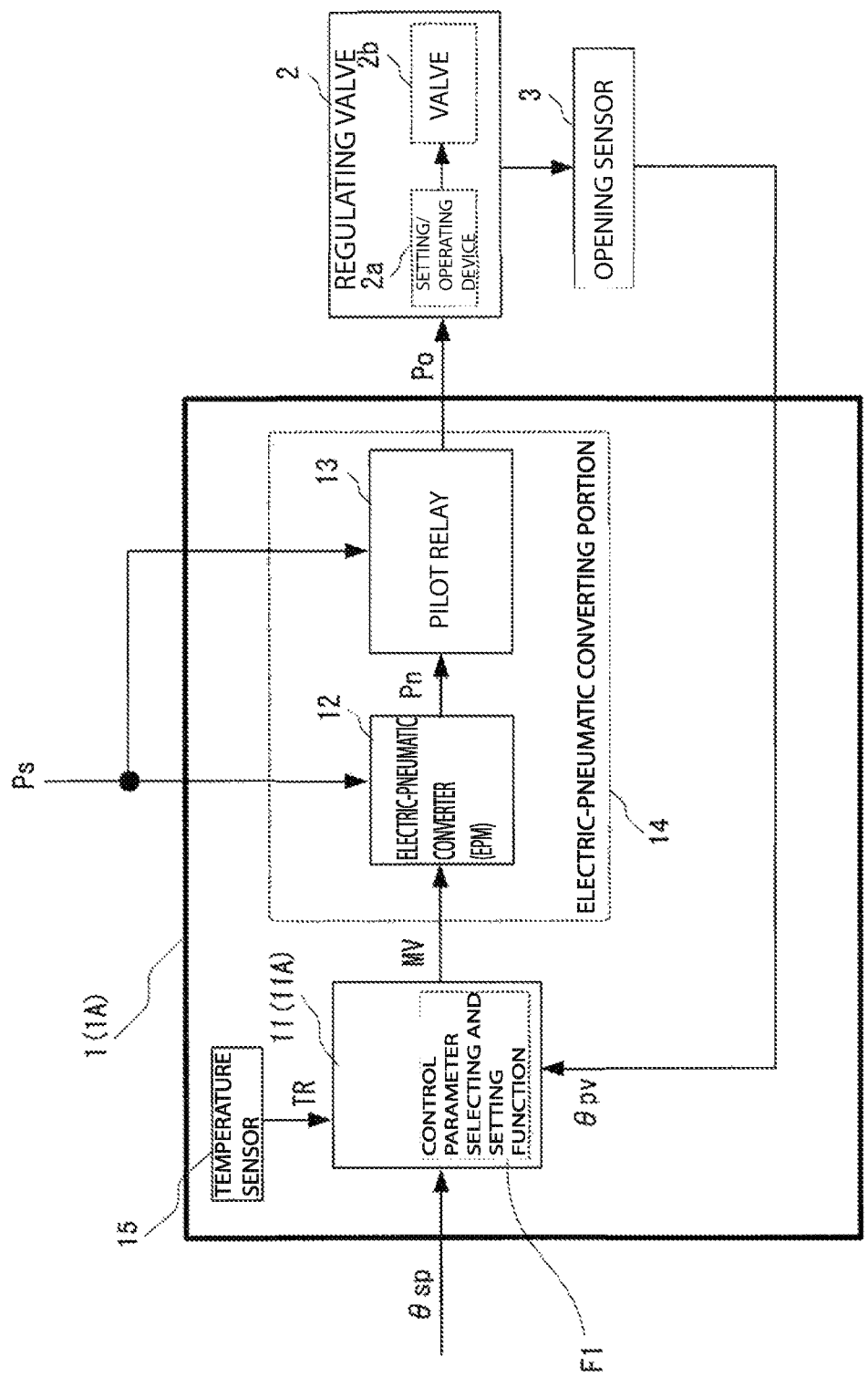
FIG. 1 illustrates the main part of a positioner according to an example of the invention.

FIG. 1 illustrates the main part of a positioner according to an example of the invention. In this drawing, the same reference numerals as in FIG. 9 indicate the same or similar components described with reference to FIG. 9 and descriptions are omitted.

The positioner 1 according to the example is provided with a supply air pressure measurement portion 15 measuring the pressure of instrumentation air for the electric-pneumatic converting portion 14 of the positioner 1 as a supply air pressure Pspv and the supply air pressure Pspv measured by the supply air pressure measurement portion 15 is given to the controlling portion 11.

In the positioner 1, as a function specific to the example, the controlling portion 11 has a control parameter selecting and setting function F1 for selecting and setting the optimum control parameters used to control the valve opening of the regulating valve 2 by correcting the operation time in determining the size of a setting/operating device.

Figure 9:
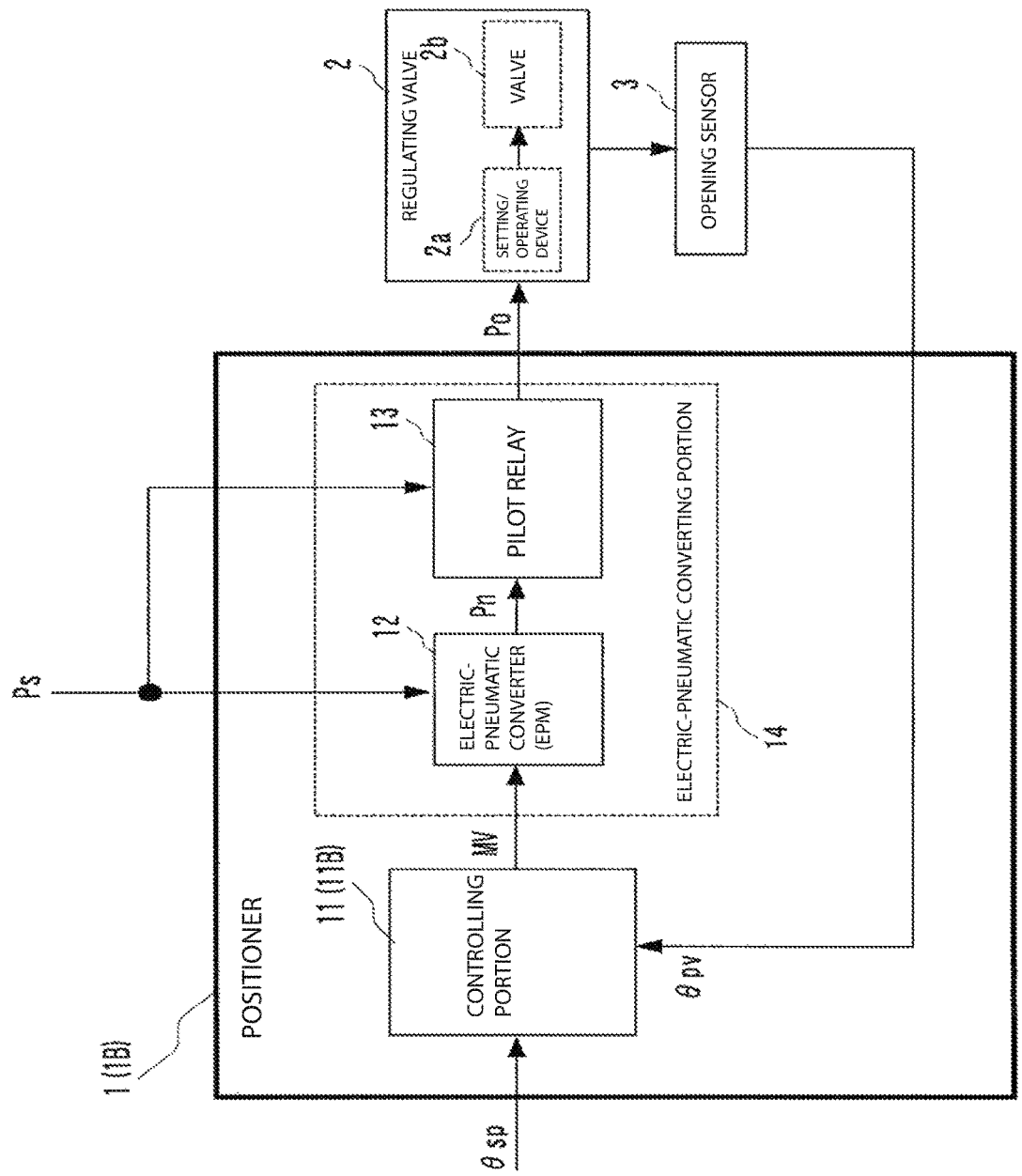
FIG. 9 illustrates the structure of the main part of a conventional positioner.
Figure 10:
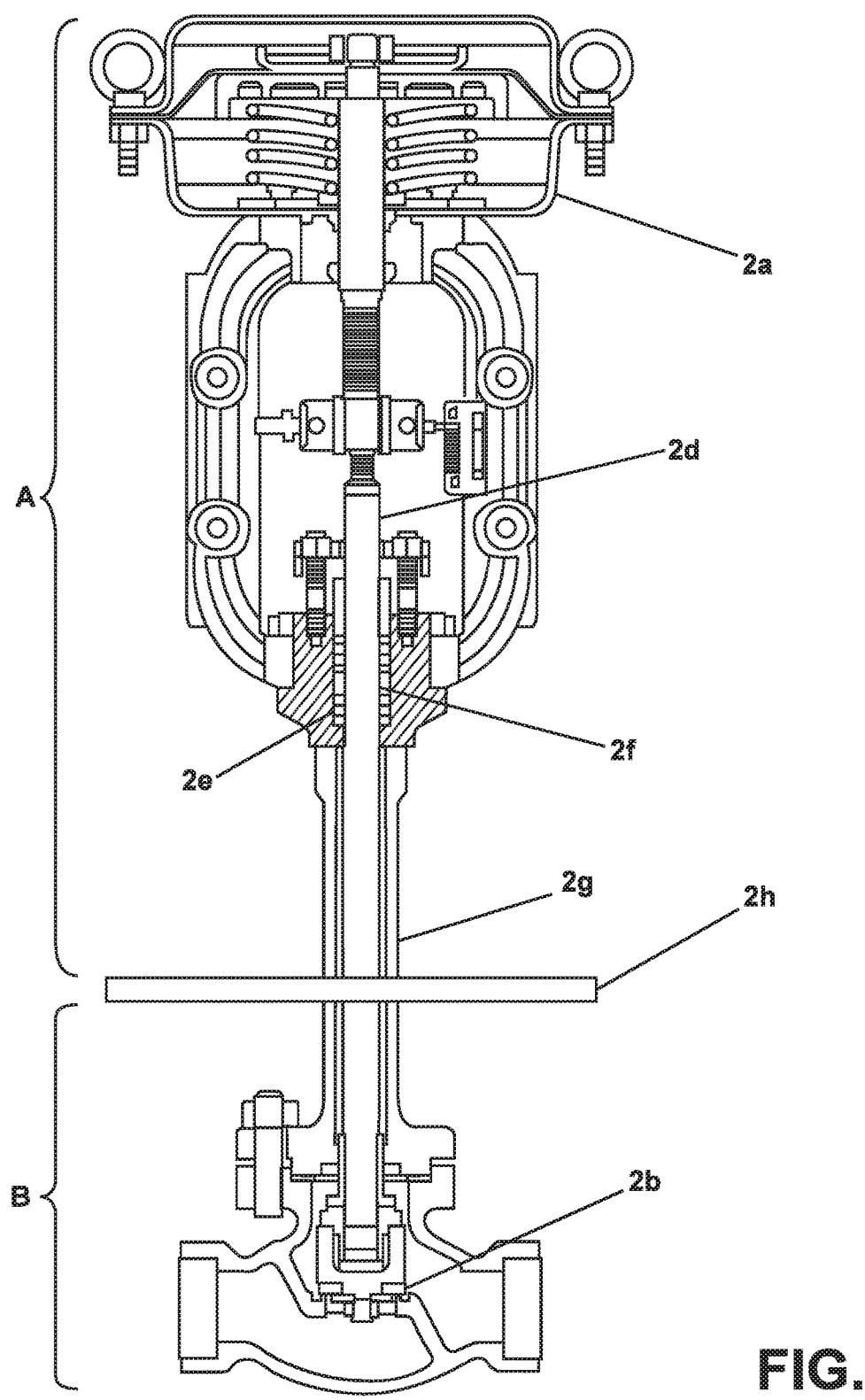
FIG. 10 illustrates the structure of the main part of a regulating valve.
Figure 11:
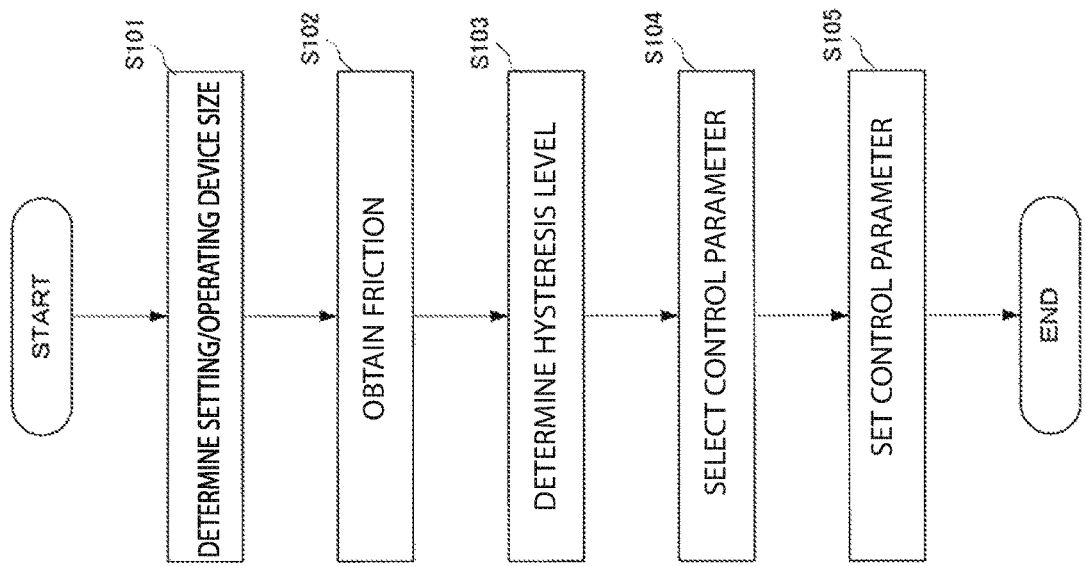
FIG. 11 is a flowchart illustrating automatic tuning in a conventional positioner.

The positioner 1 in the example is denoted below as the positioner 1A to distinguish it from the conventional positioner 1 (1B) illustrated in FIG. 9. In addition, the controlling portion 11 in the example is denoted as the controlling portion 11A to distinguish it from the controlling portion 11 (11B) in the conventional positioner 1B illustrated in FIG. 9. The controlling portion 11A is configured by hardware including a processor and memory device and a program achieving various types of functions in corporation with the hardware.

Figure 2:
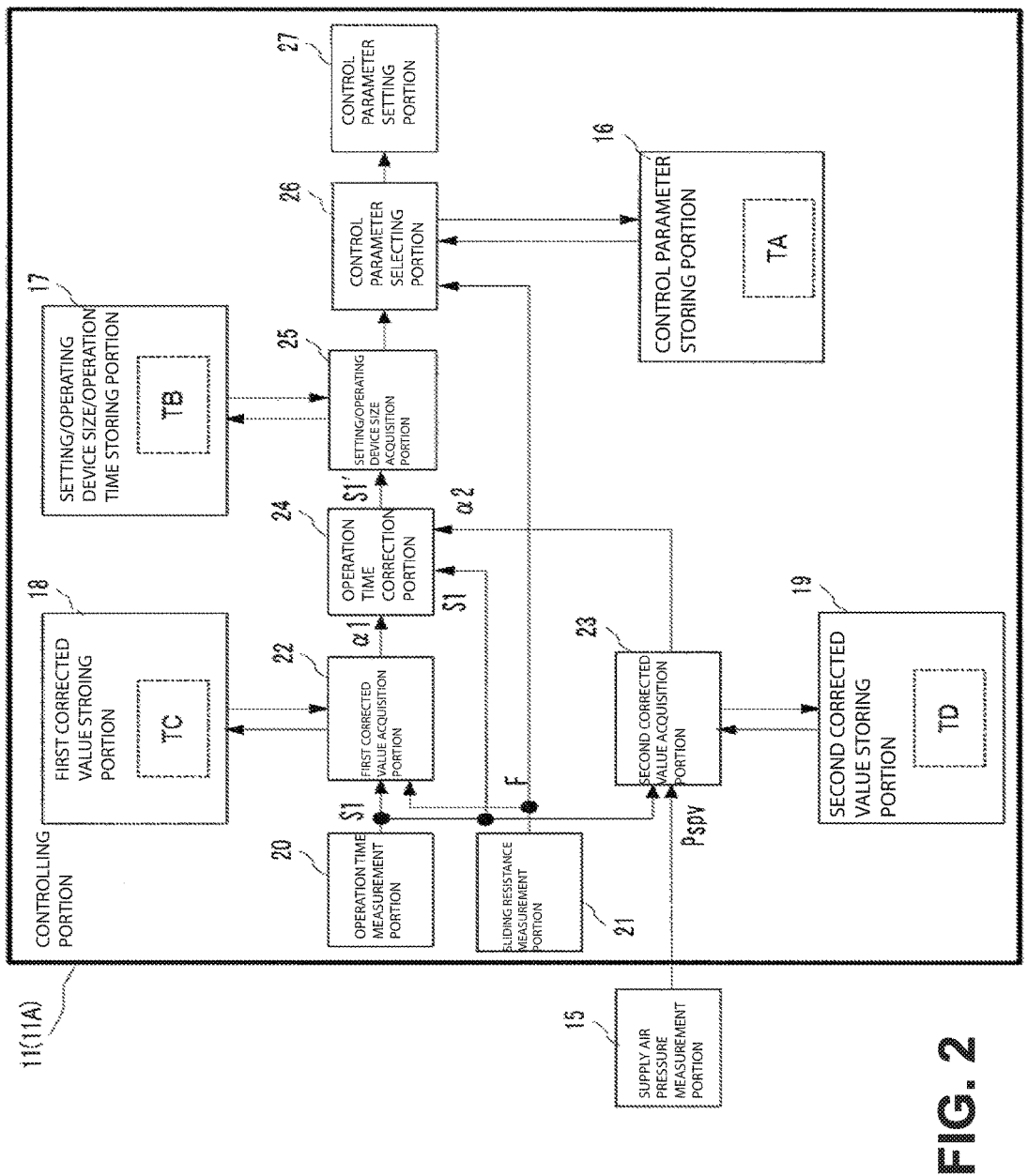
FIG. 2 is a functional block diagram illustrating the main part of a controlling portion of the positioner.

FIG. 2 is a functional block diagram illustrating the main part of the controlling portion 11A. To achieve the control parameter selecting and setting function F1, the controlling portion 11A includes a control parameter storing portion 16, a setting/operating device size/operation time storing portion 17, a first corrected value storing portion 18, a second corrected value storing portion 19, an operation time measurement portion 20, a sliding resistance measurement portion 21, a first corrected value acquisition portion 22, a second corrected value acquisition portion 23, an operation time correction portion 24, a setting/operating device size acquisition portion 25, a control parameter selecting portion 26, and a control parameter setting portion 27.

The control parameter storing portion 16 stores the control parameter table TA (see FIG. 3) defining the correspondence between the hysteresis level (HYS) and the control parameters (KP, TI, TD, GE, GKP, GTI, and GTD) for each size of a setting/operating device used in the regulating valve 2 by assuming that the level of the sliding resistance of the valve stem of the regulating valve in the invention is to be the hysteresis level (HYS). In the example, the hysteresis level (HYS) is classified into three stages (H, M, and L) and the control parameters corresponding to each of the three stages of the hysteresis level (HYS) are defined.

Figure 4:
FIG. 4 illustrates a setting/operating device size/operation time table to be stored in a setting/operating device size/operation time storing portion of the positioner.

The setting/operating device size/operation time storing portion 17 stores a setting/operating device size/operation time table TB (see FIG. 4) defining the correspondence between the operation time and the size of the setting/operating device used in the regulating valve 2. In the example, the range (operation time region) taken by the operation time of a setting/operating device X is defined as "a to b", the range (operation time region) taken by the operation time of a setting/operating device Y is defined as "b to c", and the range (operation time region) taken by the operation time of the setting/operating device Z is defined as about "c" and beyond.

Figure 6:
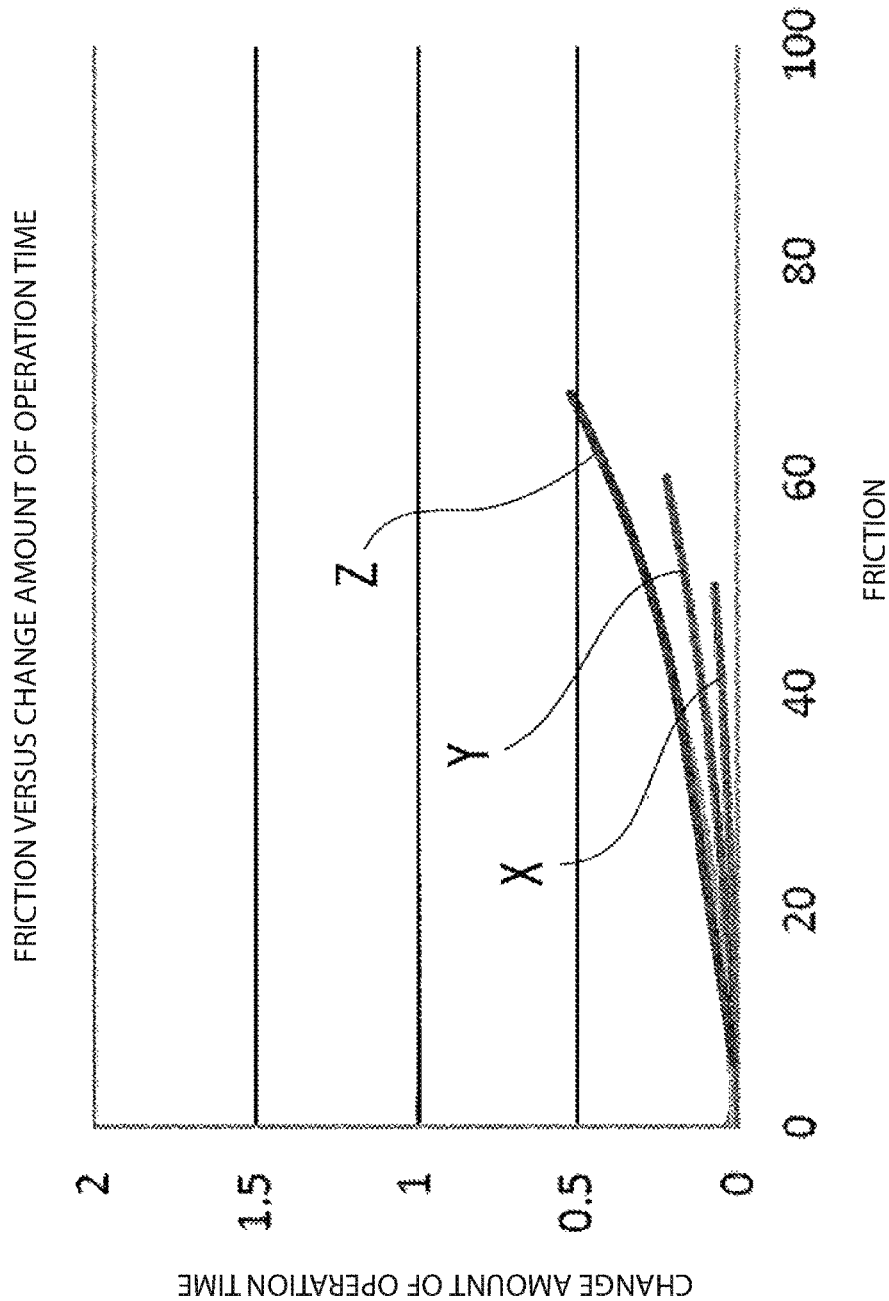
FIG. 6 illustrates the relationship between the friction and the change amount of operation time obtained for each size of the setting/operating device.

The first corrected value storing portion 18 stores a first corrected value table TC (see FIG. 5) defining, as a first corrected value $\alpha 1$, the corrected value corresponding to the operation time regions defined so as to correspond to the sizes of the setting/operating device used in the regulating valve 2 and the sliding resistance regions defined by dividing the range taken by the sliding resistance (friction) of the valve stem 2d of the regulating valve 2. By obtaining the relationship between the friction and the change amount (the difference from the operation time when the friction is 0) of operation time for each size of the setting/operating device (see FIG. 6), the first corrected value $\alpha 1$ is defined as, for example, the average value of the change amounts of the operation time in the individual divisions of the friction.

Figure 8:
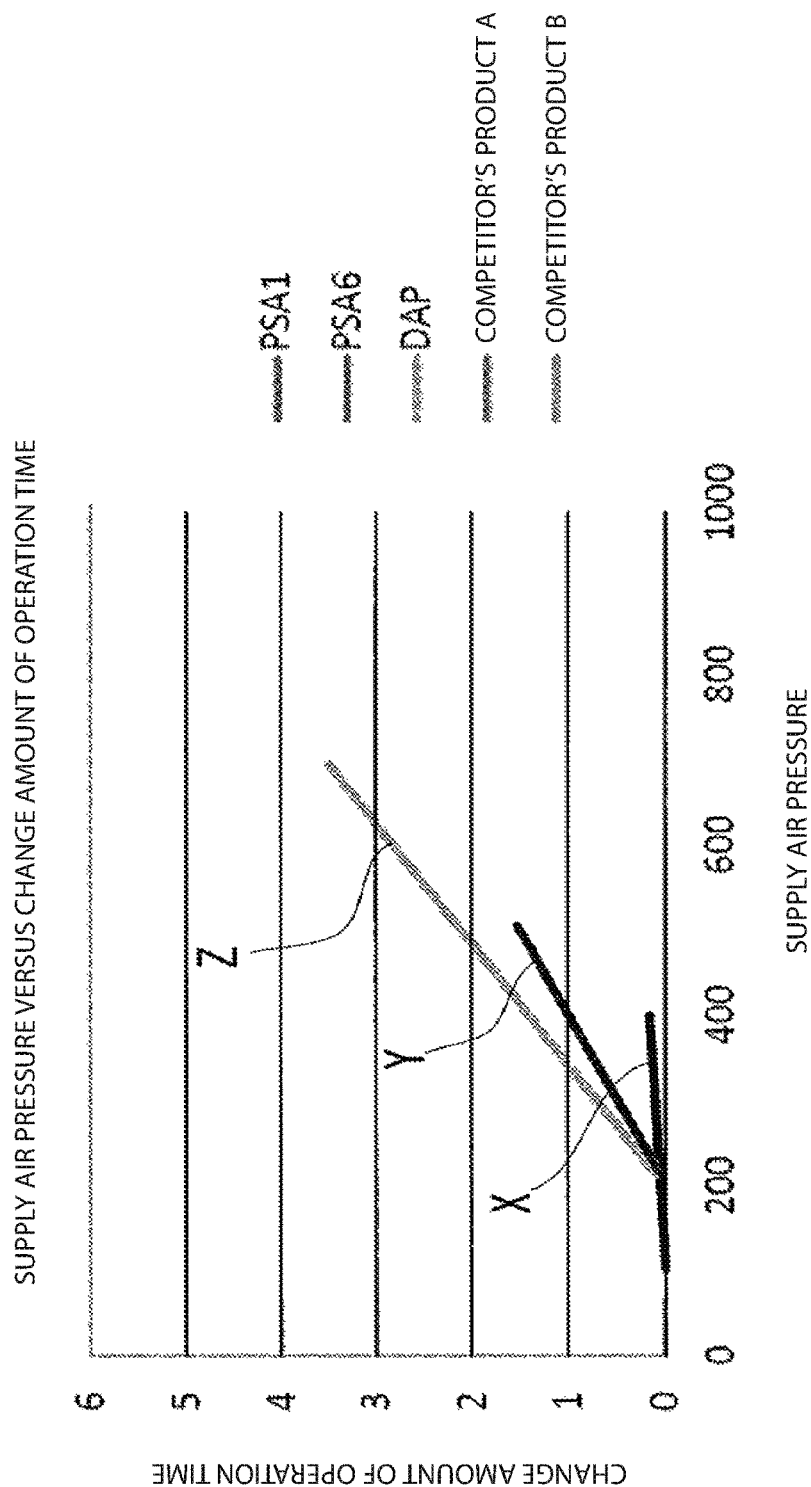
FIG. 8 illustrates the relationship between the supply air pressure and the change amount of operation time obtained for each size of the setting/operating device.

The second corrected value storing portion 19 stores the second corrected value table TD (see FIG. 7) defining, as a second corrected value $\alpha 2$, the corrected value corresponding to the operation time regions so as to correspond to the sizes of the setting/operating device used in the regulating valve 2 and the supply air pressure regions defined by dividing the range taken by the pressure (supply air pressure) Ps of instrumentation air supplied to the electric-pneumatic converting portion 14. By obtaining the relationship between the supply air pressure Ps and the change amounts (the difference from the operation time when the supply air pressure Ps is the reference value (for example, 200 kPa)) of operation time for each size of the setting/operating device (see FIG. 8), the second corrected value $\alpha 2$ is defined as, for example, the average value of the change amounts of the operation time in the individual divisions of the supply air pressure Ps.

The functions of the operation time measurement portion 20, the sliding resistance measurement portion 21, the first corrected value acquisition portion 22, the second corrected value acquisition portion 23, the operation time correction portion 24, the setting/operating device size acquisition portion 25, the control parameter selecting portion 26, and the control parameter setting portion 27 in the controlling portion 11A illustrated in FIG. 2 will be described together with their operation.

When receiving an automatic tuning instruction, the controlling portion 11A obtains, as the operation time S1 of a setting/operating device 2a, the response time when the valve opening of the regulating valve 2 continuously shifts from, for example, the 10% position to the 90% position by actually driving the regulating valve 2. This operation time S1 is obtained by the operation time measurement portion 20. In the example, the operation time measurement portion 20 measures, as the operation time S1, the average value of the reciprocating response time when the valve opening continuously shifts from the 10% position to the 90% position. Note that the reciprocating response time may be a one-way response time.

In addition, when receiving an automatic tuning instruction, the controlling portion 11A obtains the sliding resistance (stem reciprocating motion resistance) of the valve stem 2d of the regulating valve 2 as the friction F by actually driving the regulating valve 2. This friction F is obtained by the sliding resistance measurement portion 21. In the example, the sliding resistance measurement portion 21 measures the friction F based on a step response from, for example, the 40% position to the 60% position of the valve opening position of the regulating valve 2.

The operation time S1 of the setting/operating device 2a measured by the operation time measurement portion 20 is sent to the first corrected value acquisition portion 22, the second corrected value acquisition portion 23, and the operation time correction portion 24 and the friction F measured by the sliding resistance measurement portion 21 is sent to the first corrected value acquisition portion 22 and the control parameter selecting portion 26.

The first corrected value acquisition portion 22 receives the operation time S1 measured by the operation time measurement portion 20 and the friction F measured by the sliding resistance measurement portion 21 and acquires the first corrected value α1 corresponding to the operation time S1 and the friction F from the first corrected value table TC stored in the first corrected value storing portion 18. The first corrected value α1 acquired by the first corrected value acquisition portion 22 is sent to the operation time correction portion 24.

The second corrected value acquisition portion 23 receives the operation time S1 measured by the operation time measurement portion 20 and the supply air pressure Pspv measured by the supply air pressure measurement portion 15 and acquires the second corrected value α2 corresponding to the operation time S1 and the supply air pressure Pspv from the second corrected value table TD stored in the second corrected value storing portion 19. The second corrected value α2 acquired by the second corrected value acquisition portion 23 is sent to the operation time correction portion 24.

The operation time correction portion 24 receives the operation time S1 measured by the operation time measurement portion 20, the first corrected value α1 acquired by the first corrected value acquisition portion 22, and the second corrected value α2 acquired by the second corrected value acquisition portion 23 and corrects the operation time S1 measured by the operation time measurement portion 20 using the first corrected value α1 acquired by the first corrected value acquisition portion 22 and the second corrected value α2 acquired by the second corrected value acquisition portion 23. In this case, since the operation time S1 is thought to be long when the friction F is large, the first corrected value α1 is subtracted from the operation time S1. In addition, since the operation time S1 is thought to be short when the supply air pressure Pspv is high, the second corrected value α2 is added to the operation time S. The operation time S1 corrected by the operation time correction portion 24 is sent to the setting/operating device size acquisition portion 25 as an operation time S1'.

The setting/operating device size acquisition portion acquires the size of the setting/operating device corresponding to the operation time S1' corrected by the operation time correction portion 24 from the setting/operating device size/operation time table TB stored in the setting/operating device size/operation time storing portion 17. In this case, since the operation time S1' is corrected by the operation time correction portion using the first corrected value α1 and the second corrected value α2, the correct size of the setting/operating device is acquired. The size of the setting/operating device acquired by the setting/operating device size acquisition portion 25 is sent to the control parameter selecting portion 26.

The control parameter selecting portion 26 receives the size of the setting/operating device acquired by the setting/operating device size acquisition portion 25 and the friction F measured by the sliding resistance measurement portion 21 and selects the control parameters corresponding to the received size of the setting/operating device and the hysteresis level (HYS) to which the received friction F belongs from the control parameter table TA stored in the control parameter storing portion 16. The control parameters selected by the control parameter selecting portion 26 are sent to the control parameter setting portion 27.

When receiving the control parameters from the parameter selecting portion 26, the control parameter setting portion 27 sets these control parameters as the control parameters used to control the opening of the regulating valve 2. Since the correct size of the setting/operating device is acquired by the setting/operating device size acquisition portion 25, the control parameters are set as an appropriate control pattern. As described above, according to the example, even when the operation time S of the setting/operating device 2a changes due to the supply air pressure Ps or the friction F, the optimum control parameters are selected and set.

Although the invention has been described above with reference to an example, the invention is not limited to the above example. Various changes understandable to those skilled in the art can be made to the structure and details of the invention within the technical spirit of the invention. In addition, examples can be practiced in any combination without occurrence of a contradiction.

I claim:

1. A positioner comprising a controller outputting, as a control output, an electric signal according to a difference between a valve opening setting value sent from a higher-level device and an actual opening value fed back from a regulating valve and an electric-pneumatic converter converting the control output from the controlling portion to an air pressure and outputting the air pressure to a setting/operating device of the regulating valve, the positioner further comprising:
- a control parameter non-transitory storage storing, for each size of the setting/operating device used in the regulating valve, a correspondence between a level of a sliding resistance of the valve stem of the regulating valve and a control parameter used to control a valve opening of the regulating valve;
- a setting/operating device size/operation time non=transitory storage storing a correspondence between a size of the setting/operating device and an operation time for each size of the setting/operating device used in the regulating valve;
- a first corrected value non-transitory storage storing, as a first corrected value, a corrected value defined so as to correspond to an operation time region defined so as to correspond to the size of the setting/operating device used in the regulating valve and a sliding resistance region defined by dividing a range taken by the sliding resistance of the valve stem of the regulating valve;
- a second corrected value non-transitory storage storing, as a second corrected value, a corrected value defined so as to correspond to the operation time region defined so as to correspond to the size of the setting/operating device used in the regulating valve and a supply air pressure region defined by dividing an area taken by a pressure of instrumentation air to be supplied to the electric-pneumatic converting portion;
- an operation time measurer measuring an operation time of the setting/operating device used in the regulating valve by actually driving the regulating valve;
- a sliding resistance measurer measuring a sliding resistance of the valve stem of the regulating valve by actually driving the regulating valve;
- a supply air pressure measurement portion measuring the pressure of the instrumentation air supplied to the electric-pneumatic converting portion as a supply air pressure;
- a first corrected value acquirer acquiring a first corrected value corresponding to the operation time measured by the operation time measurer and the sliding resistance measured by the sliding resistance measurer from the first corrected value non-transitory storage;
- a second corrected value acquirer acquiring a second corrected value corresponding to the operation time measured by the operation time measurer and the supply air pressure measured by the supply air pressure measurer from the second corrected value storing portion;
- an operation time corrector correcting the operation time measured by the operation time measurer using the first corrected value acquired by the first corrected value acquirer and the second corrected value acquired by the second corrected value acquirer;
- a setting/operating device size acquirer acquiring the size of the setting/operating device corresponding to the operation time corrected by the operation time corrector from the setting/operating device size/operation time storing portion; and
- a control parameter selector selecting the control parameter corresponding to the size of the setting/operating device acquired by the setting/operating device size acquirer and the sliding resistance measured by the sliding resistance measurer from the control parameter non-transitory storage,
- wherein the controller controls the valve opening of the regulating valve using the control parameter selected by the control parameter selector.

* * * * *